(12) United States Patent
Ide et al.

(10) Patent No.: US 7,270,527 B2
(45) Date of Patent: *Sep. 18, 2007

(54) OPTICAL RECORDING MEDIUM-MANUFACTURING APPARATUS

(75) Inventors: Junichi Ide, Tokyo (JP); Haruhiko Yamaguchi, Tokyo (JP); Futoshi Kobayashi, Tokyo (JP); Takeshi Umega, Tokyo (JP); Tsuyoshi Itoh, Tokyo (JP); Yoshimi Yodogawa, Tokyo (JP); Mamoru Usami, Tokyo (JP)

(73) Assignee: TDK Corporation, Tokyo (JP)

( * ) Notice: Subject to any disclaimer, the term of this patent is extended or adjusted under 35 U.S.C. 154(b) by 746 days.

This patent is subject to a terminal disclaimer.

(21) Appl. No.: 10/762,306

(22) Filed: Jan. 23, 2004

(65) Prior Publication Data
US 2004/0149096 A1 Aug. 5, 2004

(30) Foreign Application Priority Data
Jan. 23, 2003 (JP) ............... 2003-014358

(51) Int. Cl.
B29C 67/00 (2006.01)
B29D 17/00 (2006.01)
B26D 5/08 (2006.01)
B26D 7/01 (2006.01)

(52) U.S. Cl. ............... 425/174.2; 425/289; 425/304; 425/810; 83/51; 83/621; 83/682

(58) Field of Classification Search ............... 83/682, 83/621, 51; 425/174.2, 304, 810
See application file for complete search history.

(56) References Cited

U.S. PATENT DOCUMENTS

| | | | |
|---|---|---|---|
| 6,740,181 B1 * | 5/2004 | Lim ............... | 156/73.3 |
| 7,047,859 B2 * | 5/2006 | Ide et al. ............ | 83/621 |
| 7,096,770 B2 * | 8/2006 | Ide et al. ............ | 83/682 |
| 2004/0061247 A1 | 4/2004 | Koyama | |

FOREIGN PATENT DOCUMENTS

| | | |
|---|---|---|
| JP | 2-155628 | 6/1990 |
| JP | 3-019153 | 1/1991 |

(Continued)

OTHER PUBLICATIONS

English LanguagAbstract JP 2004-059124.

(Continued)

*Primary Examiner*—Robert Davis
*Assistant Examiner*—Marissa W. Chaet
(74) *Attorney, Agent, or Firm*—Greenblum & Bernstein, P.L.C.

(57) ABSTRACT

There is provided an optical recording medium-manufacturing apparatus that is capable of avoiding breakage of a substrate while avoiding formation of a central hole off-center with respect to the substrate. A control section causes the vertical movement section to move an ultrasonic horn in directions toward and away from the cutting edge of a punching blade section to thereby cause the ultrasonic horn to press the disk-shaped substrate and at the same cause an ultrasonic generator to perform ultrasonic vibration at least from a time point at which the disk-shaped substrate is brought into contact with the cutting edge of the punching blade section to a time point at which the punching of the central hole is completed.

6 Claims, 9 Drawing Sheets

FOREIGN PATENT DOCUMENTS

| | | |
|---|---|---|
| JP | 9-057696 | 3/1997 |
| JP | 10-040584 | 2/1998 |
| JP | 10-249264 | 9/1998 |
| JP | 10-289489 | 10/1998 |
| JP | 2003-059124 | 2/2003 |
| JP | 2004-39149 | 2/2004 |

OTHER PUBLICATIONS

English LanguagAbstract JP 10-040584.
English LanguagAbstract JP 10-249264.
English Language Abstract JP 2004-39149.
English Language Abstract of JP 2-155628.
English Language Abstract of JP 9-057696.
English Language Abstract of JP 10-289489.
English Language Abstract of JP 3-019153.

* cited by examiner

OPTICAL RECORDING MEDIUM-MANUFACTURING APPARATUS

BACKGROUND OF THE INVENTION

1. Field of the Invention

The present invention relates to an optical recording medium-manufacturing apparatus that manufactures an optical recording medium by punching a central hole through a disk-shaped substrate.

2. Description of the Related Art

In general, when an optical recording medium (optical disk), such as a CD or a DVD, is manufactured, a thin film, such as a light-reflecting layer, is formed on a disk-shaped substrate having grooves and lands formed in a surface thereof by injection molding, and then a resin layer as a protective layer is formed on the thin film by the spin-coating method such that the protective layer covers the thin film. Further, when a writable optical recording medium, such as a CD-R, a CD-RW, a DVD-R, or a DVD-RW, is manufactured, thin films, such as a light-reflecting layer and a recording layer, are sequentially formed on a surface of a substrate, and then a resin layer as a protective layer is formed on top of the thin films by the spin-coating method such that the protective layer covers the thin films. If the optical recording media thus manufactured has variation in the film thickness of the resin layer thereof, it is difficult to reliably prevent damage from occurring to the thin film(s). Therefore, in the formation of a resin layer, it is necessary to spin-coat the entire surface of a substrate with a resin material for forming a resin layer, to a uniform thickness. Further, to form a resin layer having a uniform thickness on a substrate by the spin-coating method, it is preferable to drop a resin material onto the center of a substrate being rotated. However, it is necessary to form a central hole in the center of an optical recording medium, for enabling clamping (chucking) e.g. by a recording and reproducing apparatus, which makes it difficult to drop a resin material onto the center of a substrate during execution of spin-coating operation. To overcome this problem, the present inventors have proposed, in Japanese Patent Application No. 2002-196415, an optical recording medium-manufacturing apparatus (hereinafter also referred to as the "manufacturing apparatus") which is configured to drop a resin material onto a substrate before forming a central hole, thereby forming a resin layer with a uniform thickness, and then punch the central hole such that the central hole extends through the substrate and the resin layer.

In the proposed manufacturing apparatus, first, an information-recording surface of a disk-shaped substrate (substrate) having no central hole formed in a central portion thereof is spin-coated with a resin for forming a light transmission layer. In this case, differently from the CD and the DVD of the type referred to hereinabove, an optical recording medium manufactured by the manufacturing apparatus proposed by the present inventors is configured such that in recording or reproducing record data, a laser beam is caused to enter the medium from a front surface side of a resin layer formed on a thin film. Therefore, in the manufacturing apparatus, when the optical recording medium is manufactured, a light transmission layer for transmitting a laser beam therethrough is formed in place of the protective layer in the above example. More specifically, an ultraviolet-curing resin, for example, is dropped onto the center (portion to be formed with a central hole afterwards) of a substrate being rotated by a coating device such that the resin material is caused to expand toward the periphery of the substrate by centrifugal force generated by rotation of the substrate. In doing this, the rotational speed of the substrate is properly adjusted, whereby the resin material is uniformly coated on the entire information-recording surface. Then, an ultraviolet ray is irradiated onto the resin coated on the substrate such that the resin is cured to form a light transmission layer.

Then, a circular cut having a diameter approximately equal to that of the central hole is formed in the light transmission layer in an area of the light transmission layer where a central hole is to be formed. More specifically, the substrate is rotated in a state where a blade of a tool is pushed into the light transmission layer, whereby a cut having a depth approximately equal to the thickness of the light transmission layer is formed in the light transmission layer. Subsequently, the substrate is transferred by a transfer mechanism from a processing location for forming a cut (hereinafter also referred to as the "cut-forming location") to a location for forming a central hole (hereinafter also referred to as the "central hole-forming location"). Then, a hollow cylindrical punching tool is pushed into the substrate from the side where the light transmission layer is formed, to thereby punch a central hole. In doing this, since the cut has been formed in the light transmission layer prior to punching the central hole, peeling-off or formation of burrs is prevented from occurring to the light transmission layer during formation of the central hole. By carrying out the steps described above, the optical recording medium is completed. Thereafter, the optical recording medium is transferred by the transfer mechanism from the central hole-forming location to a stack location for stacking completed optical recording media.

However, from the study of the proposed manufacturing apparatus, the present inventors found out the following points for improvement: In the proposed manufacturing apparatus, a central hole is formed by moving a punching tool in the direction of thickness of a substrate to push the tool therein (pressure cut). Therefore, when the central hole is formed, a considerably large force is applied to the substrate in the moving direction of the punching tool, so that there is a fear of a central portion or its vicinity being partially broken before the cutting edge of the punching tool reaches the reverse side of the substrate (before the central hole is punched out). It is desirable to avoid this inconvenience. For this purpose, there has been conventionally proposed a method of smoothly pushing the tool (blade) into the object to be cut while causing ultrasonic vibration of the tool. This method enables the punching tool to be smoothly pushed into the substrate. However, the ultrasonic vibration of the punching tool makes it difficult to position the punching tool with respect to the substrate, so that there is a fear of an central hole being formed off-center with respect to the substrate. Further, in the manufacturing apparatus proposed by the present inventors, the substrate can be moved away by being caught by the punching tool when the punching tool is pulled out from the substrate after completing formation of the central hole, or can be moved together with a punched piece that is punched off from the substrate when the punched piece is removed. Hence, improvement in this point is desired.

SUMMARY OF THE INVENTION

The present invention has been made to solve the above described problems, and a first object thereof is to provide an optical recording medium-manufacturing apparatus which is capable of avoiding breakage of a substrate while avoiding formation of a central hole off-center with respect to the substrate. Further, a second object of the invention is to provide an optical recording medium-manufacturing apparatus which is capable of preventing a disk-shaped substrate from being moved by motion of a punching tool or removable of a punched piece.

To attain the first object, in a first aspect of the present invention, there is provided an optical recording medium-manufacturing apparatus comprising a punching blade section that is pushed into a disk-shaped substrate to thereby punch a central hole through the disk-shaped substrate, the punching blade section having a cutting edge, a pressing device that presses the disk-shaped substrate toward the punching blade section to thereby push the punching blade section into the disk-shaped substrate, the pressing device having an abutment portion that is brought into abutment with the disk-shaped substrate, a moving mechanism that moves the abutment portion in an approaching one of directions toward and away from the cutting edge of the punching blade section to thereby press the disk-shaped substrate, and an ultrasonic generator that causes ultrasonic vibration of the abutment portion, and a control section that controls operation of the pressing device by causing the moving mechanism to move the abutment portion in the approaching direction and causing the ultrasonic generator to perform ultrasonic vibration at least from a time point at which the disk-shaped substrate is brought into contact with the cutting edge of the punching blade section to a time point at which punching of the central hole is completed.

With the arrangement of the above optical recording medium-manufacturing apparatus, the control section causes the moving mechanism to move the abutment portion in the direction approaching the cutting edge of the punching blade section to thereby press the disk-shaped substrate, and causes the ultrasonic generator to continuously perform ultrasonic vibration from a time point at which the disk-shaped substrate is brought into contact with the cutting edge of punching blade section to a time point at which the punching of the central hole is completed. This causes the disk-shaped substrate to perform ultrasonic vibration by the ultrasonic waves transmitted by the ultrasonic horn when the central hole is punched through the disk-shaped substrate, so that the cutting edge of the punching blade section can be smoothly pushed into the disk-shaped substrate. Therefore, even with a small force relatively applied to the disk-shaped substrate in the direction approaching the cutting edge of the punching blade section, the punching blade section can be pushed into the substrate. This prevents the substrate from being partially broken before the cutting edge of the punching blade section reaches the reverse side of the substrate (before the central hole is punched out). Further, differently from the configuration in which the central hole is punched while causing ultrasonic vibration of the punching blade section, the disk-shaped substrate can be brought into abutment with the punching blade section at rest, which makes it possible to prevent the central hole from being formed off-center with respect to the substrate.

Preferably, the optical recording medium-manufacturing apparatus further comprises a positioning protrusion disposed in a central portion of the punching blade section in a manner slidable in the toward and away directions, and a first urging device that urges the positioning protrusion toward the pressing device, and the positioning protrusion is configured such that the positioning protrusion has a foremost end thereof protruded toward the pressing device with respect to the cutting edge of the punching blade section, and at the same time is capable of being inserted into a positioning hole formed in a central portion of the disk-shaped substrate, the positioning hole having a diameter smaller than a diameter of the central hole, the moving mechanism causing the abutment portion to move in the approaching direction to thereby cause the positioning protrusion inserted in the positioning hole to move in the approaching direction together with the disk-shaped substrate, to thereby cause the punching blade section to be pushed into the disk-shaped substrate. With the arrangement of this preferred embodiment, it is possible to cause the disk-shaped substrate to be brought into abutment with the punching blade section with the center of the disk-shaped substrate being aligned with the center of the punching blade section, and therefore, it is possible to positively prevent the central hole being formed off-center with respect to the substrate.

Preferably, the optical recording medium-manufacturing apparatus further comprises a substrate-receiving table formed with an insertion hole in a central portion thereof for allowing insertion of the punching blade section such that the substrate receiving table is slidable with respect to the punching blade section in the toward and away directions, and a second urging device that urges the substrate-receiving table toward the pressing device, the substrate-receiving table being normally positioned such that a surface of the substrate-receiving table which is brought into contact with the disk-shaped substrate is closer to the pressing device with respect to the cutting edge of the punching blade section, and the moving mechanism causes the abutment portion to move in the approaching direction, to thereby cause the substrate-receiving table to move in the approaching direction together with the disk-shaped substrate to cause the punching blade section to be pushed into the disk-shaped substrate, the substrate-receiving table causing the disk-shaped substrate to move in the approaching direction when the disk-shaped substrate is pressed by the moving mechanism. With the arrangement of this preferred embodiment, in a normal state, the cutting edge of the punching blade section is not protruded from the contract surface of the table on which the substrate is placed, which makes it possible to prevent an operator from being injured by an accidental or careless touch of his hand on the cutting edge of the punching blade section by accident, and prevent the punching blade section from being broken owing to contact with other tools. Further, the substrate-receiving table causes e.g. the translating motion of the disk-shaped substrate, whereby it is possible to prevent the substrate from being inclined when the central hole is punched. This makes it possible to form the central hole which is perpendicular to the horizontal surface of the substrate.

Preferably, the second urging device is implemented by air cylinders. With the arrangement of this preferred embodiment, it is possible to prevent variation in the position of the substrate-receiving table caused by permanent setting in fatigue of a spring, and hence accurately punch the central hole.

Preferably, the optical recording medium-manufacturing apparatus further comprises a substrate-holding section that sucks a portion of the disk-shaped substrate outward of an area where the central hole is formed, to thereby hold the disk-shaped substrate, and a punched piece-holding section that holds a punched piece which is punched off the disk-shaped substrate by the punching blade section. With the arrangement of this preferred embodiment, it is possible to positively prevent the optical recording medium from being moved upward (moved) by the upward motion of the abutment portion, and it is no longer necessary for the operator to manually remove the punched piece from the disk-shaped substrate, thereby contributing to further enhanced manufacturing efficiency of the optical recording medium.

Preferably, the ultrasonic generator causes longitudinal vibration of the abutment portion. Since the ultrasonic generator causes the longitudinal vibration of the ultrasonic horn, differently from the configuration in which the ultrasonic horn is caused to perform simple harmonic motion along the horizontal surface of the disk-shaped substrate, for example, the disk-shaped substrate does not make a shift in position (vibration) in the horizontal direction, so that the central hole can be punched in a state where the center of the disk-shaped substrate and that of the punching blade section are coincident with each other. This makes it possible to further positively prevent the central hole from being formed off-center with respect to the substrate.

It should be noted that the present disclosure relates to the subject matter included in Japanese Patent Application No. 2003-014358 filed on Jan. 23, 2003, and it is apparent that all the disclosures therein are incorporated herein by reference.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

The invention will now be described with reference to the accompanying drawings showing a preferred embodiment thereof.

First, a description will be given of the arrangement of an optical recording medium-manufacturing apparatus according to the present invention and the construction of an optical recording medium.

Figure 1:
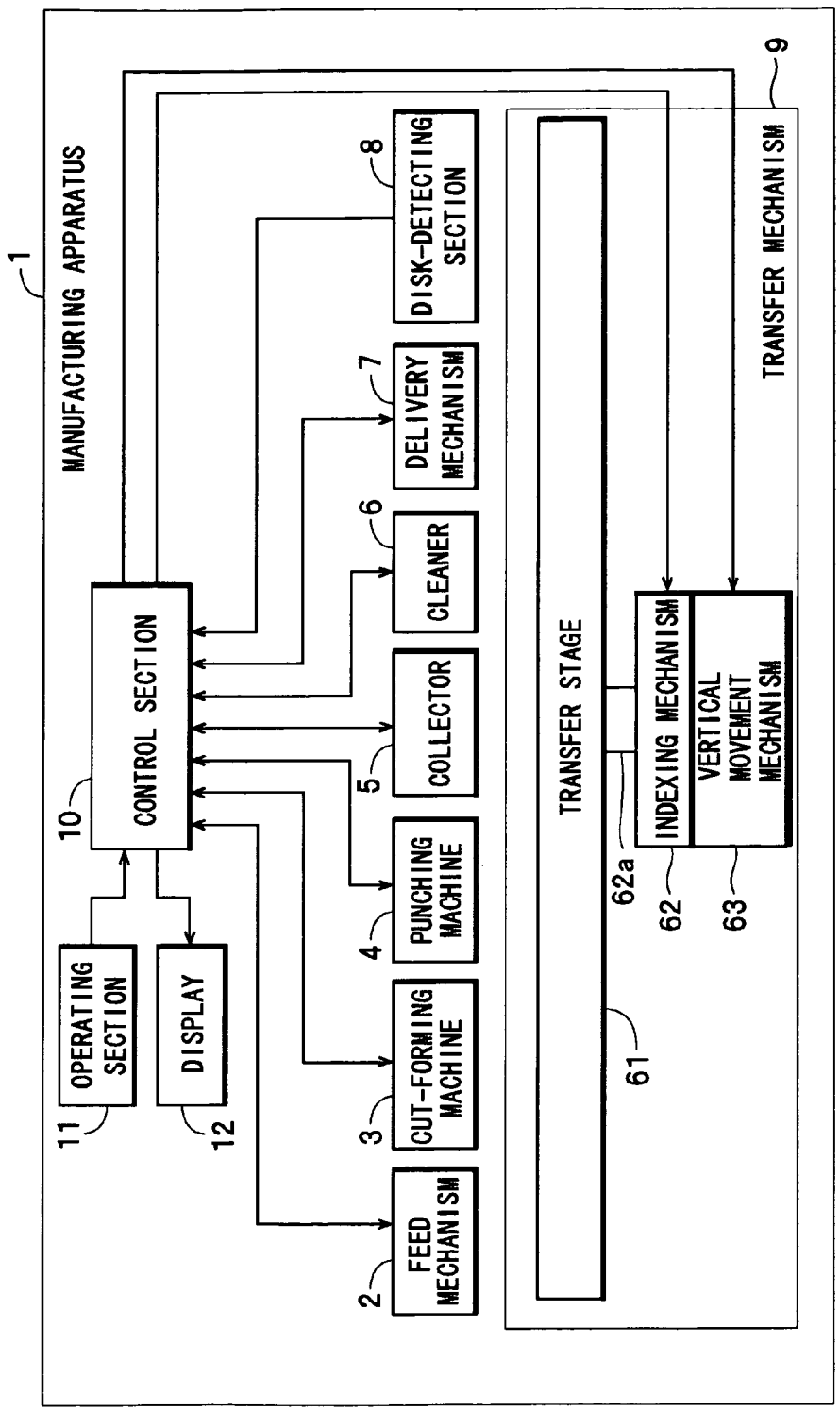
FIG. 1 is a block diagram showing the arrangement of a manufacturing apparatus according to an embodiment of the present invention.
Figure 2:
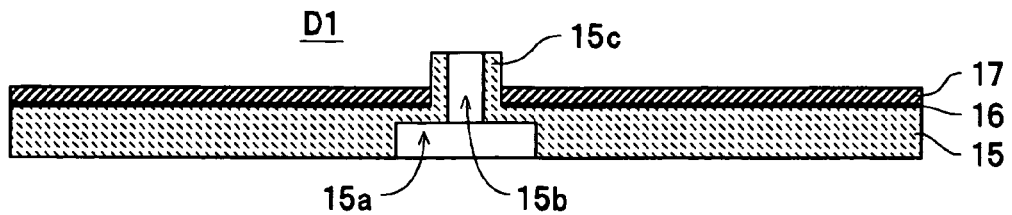
FIG. 2 is a cross-sectional view of a disk-shaped substrate before a cut and a central hole are formed therein.
Figure 3:
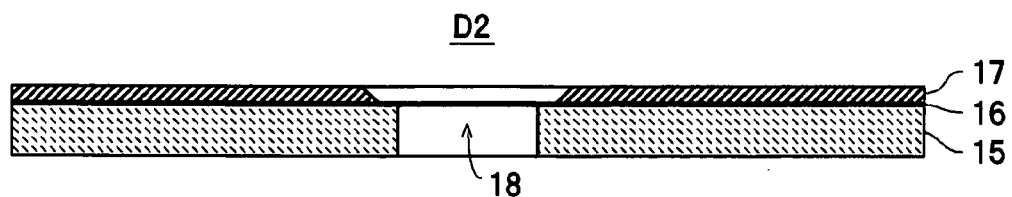
FIG. 3 is a cross-sectional view of an optical recording medium produced by the manufacturing apparatus.

A manufacturing apparatus 1 shown in FIG. 1 includes the optical recording medium-manufacturing apparatus according to the present invention, and manufactures an optical recording medium D2 (see FIG. 3) by forming a cut 17a (see FIG. 7) in a light transmission layer 17 of a disk-shaped substrate D1 (see FIG. 2), and then punching a central hole 18. In this embodiment, as shown in FIG. 2, the disk-shaped substrate D1 is comprised of a substrate 15 in the form of a disk, thin films 16, such as a light-reflecting layer and a recording layer, sequentially formed on one or upper surface of the substrate 15, and the light transmission layer 17 formed such that the layer 17 covers the thin films 16. The substrate 15 is molded by injecting a resin material, such as a polycarbonate, prior to preparation of the disk-shaped substrate D1. In the present embodiment, the other or lower surface of the substrate 15 has a central portion formed with a recess 15a whose bottom surface is to be punched afterwards for formation of the central hole 18. In the illustrated example, the recess 15a is formed to have a diameter of 15 mm, equal (equivalent) to the diameter of the central hole 18. Further, in the upper surface of the substrate 15, there are formed grooves and lands by injection molding, and a hollow cylindrical protrusion 15c formed with a positioning hole 15b for positioning the disk-shaped substrate D1 with respect to a cut-forming machine 3 and a punching machine 4 when the cut 17a and the central hole 18 are formed. In the present embodiment, the positioning hole 15b is formed such that it has a diameter of e.g. 5 mm, and the center thereof coincides with the center of the recess 15a. The light transmission layer 17 is a resin layer for protecting the thin films 16 formed on the substrate 15 and allowing transmission of a laser beam therethrough during reproduction of recorded data. For example, the light transmission layer 17 is coated with an ultraviolet-curing resin material by the spin-coating method, and formed to have a thickness of approximately 100 μm. Further, as shown in FIG. 3, the optical recording medium D2 is constructed by forming the central hole 18 having a diameter of approximately 15 mm through the central portion of the disk-shaped substrate D1. It should be noted that for ease of understanding of the present invention or simplicity, description of the construction of the thin films 16, etc. and the method of forming the same is omitted.

Figure 4:
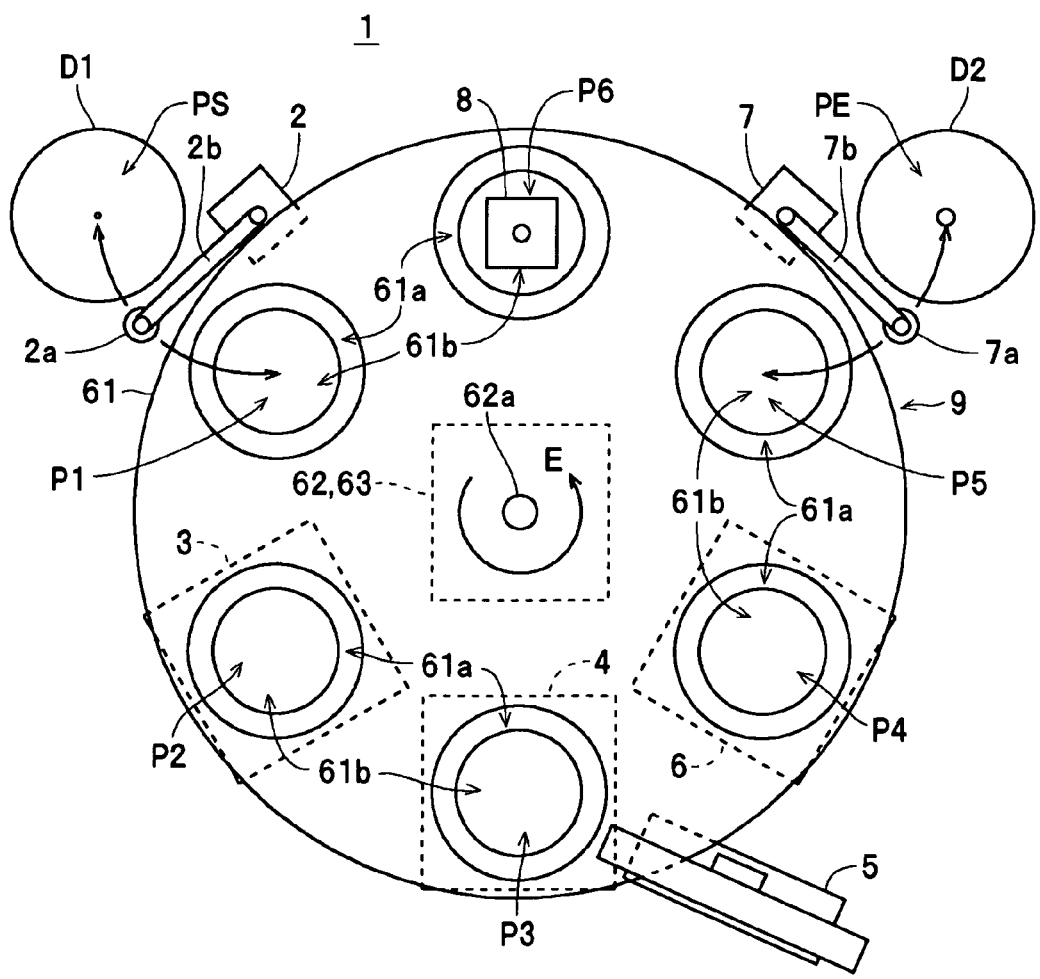
FIG. 4 is a plan view showing the arrangement of the manufacturing apparatus.

Referring to FIG. 1, the manufacturing apparatus 1 is comprised of a feed mechanism 2, the cut-forming machine 3, the punching machine 4, a collector 5, a cleaner 6, a delivery mechanism 7, a disk-detecting section 8, a transfer mechanism 9, a control section 10, an operating section 11, and a display 12. As shown in FIG. 4, the feed mechanism 2 includes a pivot arm 2b which is configured to be vertically movable and has a sucking portion 2a mounted at an end thereof, for holding the disk-shaped substrate D1 thereat by suction. The feed mechanism 2 feeds the disk-shaped substrate D1 from a stack location PS to a feed location P1 under the control of the control section 10. At the stack location PS, there are stacked a plurality of disk-shaped substrates D1, D1 . . . for which formation of a light transmission layer 17 is completed.

Figure 5:
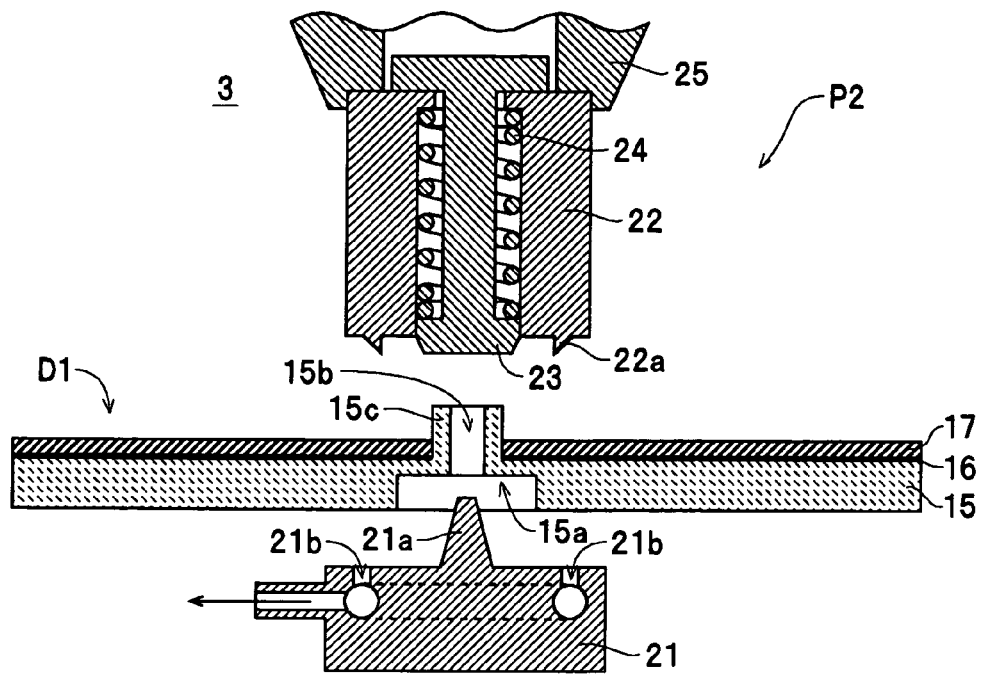
FIG. 5 is a cross-sectional view showing the arrangement of a cut-forming machine of the manufacturing apparatus.

The cut-forming machine 3 includes a table 21, a cut-forming blade section 22, an urging portion 23, a spring 24, and a vertical movement mechanism 25, as shown in FIG. 5, and mounted at a cut-forming location P2, as shown in FIG. 4. The table 21, as shown in FIG. 5, has an upper surface formed to be flat such that the disk-shaped substrate D1 can be placed thereon. Further, a positioning protrusion 21a having a truncated conical shape is formed on a central portion of the upper surface of the table 21 in a manner protruding upward therefrom, for being fitted in the positioning hole 15b of the disk-shaped substrate D1, and thereby positioning the disk-shaped substrate D1 with respect to the table 21. Further, the table 21 is configured such that a plurality of suction holes 21b, 21b, . . . for attracting the disk-shaped substrate D1 thereto by sucking air existing between the upper surface of the table 21 and the lower surface of the disk-shaped substrate D1 are formed around the positioning protrusion 21a. The cut-forming blade section 22 has a hollow cylindrical shape for being mounted on the vertical movement mechanism 25, with a blade 22a formed on a bottom end face thereof in a protruding manner, for forming a cut 17a (see FIG. 6) in the light transmission layer 17 of the disk-shaped substrate D1. The blade 22a has an annular shape with a diameter of approximately 16 mm, larger than the diameter of the central hole 18. Further, the height of the blade 22a is defined to be approximately 105 µm, which is slightly larger than the thickness (e.g. approximately 100 µm) of the light transmission layer 17, according to the depth of the cut 17a to be formed in the light transmission layer 17. The urging portion 23 is urged downward toward the cut-forming blade section 22 by the spring 24, and when the vertical movement mechanism 25 causes the cut-forming blade section 22 to move downward, the urging portion 23 urges the disk-shaped substrate D1 downward to cause the same to be pressed downward.

Figure 6:
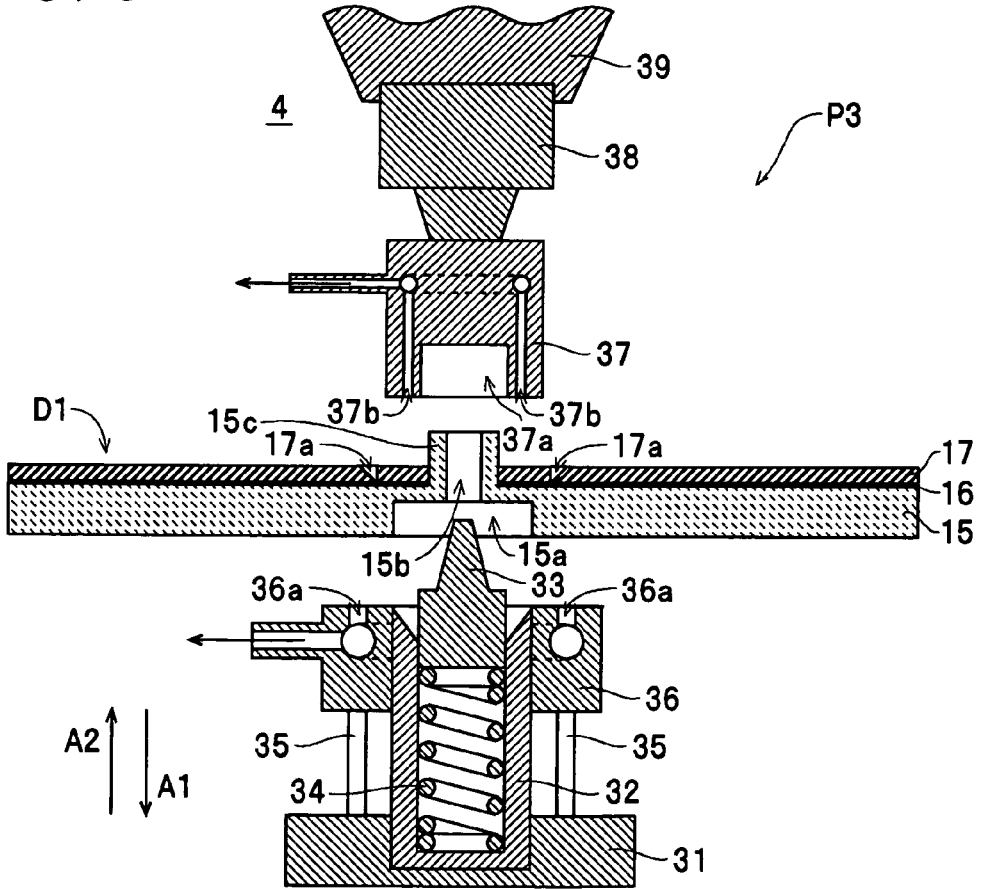
FIG. 6 is a cross-sectional view showing the arrangement of a punching machine of the manufacturing apparatus.

The punching machine 4 corresponds to the optical recording medium-manufacturing apparatus according to the present invention, and is comprised of, as shown in FIG. 6, a base 31, a punching blade section 32, a positioning protrusion 33, a spring 34, air cylinders 35, 35, . . . , a substrate-receiving table 36, an ultrasonic horn 37, an ultrasonic generator 38, and a vertical movement mechanism 39. As shown in FIG. 4, the punching machine 4 is disposed at a central hole-forming location P3. The punching blade section 32 is, as shown in FIG. 6, in the form of a bottomed hollow cylinder with an outer shape having a diameter (outer diameter) of 15 mm, equal to the inner diameter of the central hole 18, and rigidly fixed to the base 31. The punching blade section 32 is pressed (pushed) into the disk-shaped substrate D1 pushed downward by the vertical movement mechanism 39, to thereby punch the central hole 18 through the disk-shaped substrate D1. The positioning protrusion 33 in the form of a truncated conical shape is disposed within the punching blade section 32, and urged upward by the spring 34, which corresponds to a first urging device in the present invention, such that the positioning protrusion 33 is fitted (inserted) into the positioning hole 15b of the disk-shaped substrate D1, for positioning the disk-shaped substrate D1 with respect to the punching blade section 32.

The air cylinders 35 correspond to a second urging device in the present invention, and for example, when the disk-shaped substrate D1 is moved downward, e.g. compressed air is supplied to an air chamber formed within the substrate-receiving table 36 by a pressure pump, not shown, whereby the air cylinders 35 allow the translating motion of the substrate-receiving table 36 in a direction indicated by an arrow A1 (in a downward direction) with respect to the base 31, whereas when the disk-shaped substrate D1 is moved upward, compressed air is supplied to an air chamber formed within the base 31 by the pressure pump, whereby the air cylinders 35 allow the translating motion of the substrate-receiving table 36 in a direction indicated by an arrow A2 (in an upward direction) with respect to the base 31. It should be noted that when a coil spring is employed in place of the air cylinders 35, the coil spring can develop permanent set in fatigue due to repeated upward and downward motions of the substrate-receiving table 36 to shorten the free length thereof. In such a case, variation in the position (height) of the substrate-receiving table 36 with respect to the punching blade section 32 or the ultrasonic horn 37 can make it difficult to accurately punch the central hole 18. On the other hand, the air cylinders 35 cannot develop permanent set in fatigue even after they are repeatedly expanded and contracted, so that the variation in the position of the substrate-receiving table 36 is avoided. The substrate-receiving table 36 has a generally hollow cylindrical shape and is mounted to the base 31 via the air cylinders 35 such that the substrate-receiving table 36 can be moved upward and downward along the side surface of the punching blade section 32. The substrate-receiving table 36 has an upper surface thereof formed flat such that it can be brought into surface contact with the lower surface of the disk-shaped substrate D1 having the cut 17a formed in the upper surface thereof. Further, the substrate-receiving table 36 corresponds to a substrate-holding portion in the present invention and is formed with a plurality of suction holes 36a, 36a, . . . for attracting the disk-shaped substrate D1 by sucking air between the upper surface of the substrate-receiving table 36 and the lower surface of the disk-shaped substrate D1. It should be noted that as shown in FIG. 6, the normal or unmoved position of the substrate-receiving table 36 in the direction of height thereof is defined as a position in which a cutting edge of the punching blade section 32 is inhibited from protruding from the upper surface (surface brought into contact with the disk-shaped substrate D1) of the substrate-receiving table 36.

The ultrasonic horn 37 corresponds to an abutment portion in the present invention, and forms the urging device in the present invention together with the ultrasonic generator 38 and the vertical movement mechanism 38. The ultrasonic horn 37 has a generally hollow cylindrical shape, and is mounted on the vertical movement mechanism 39 together with the ultrasonic generator 38, for transmitting ultrasonic waves generated by the ultrasonic generator 38 to the disk-shaped substrate D1 while urging on the upper surface of the disk-shaped substrate D1 downward, when the central hole 18 is formed. Further, the ultrasonic horn 37, which corresponds to a punched piece-holding section in the present invention, has a lower surface thereof formed with a recess 37a into which the protrusion 15c of the disk-shaped substrate D1 can be inserted. Furthermore, the ultrasonic horn 37 is formed with a plurality of suction holes 37b, 37b, . . . for sucking air around the protrusion 15c of a punched piece CH (see FIG. 16) punched off by the punching blade section 32 (air on the upper surface of the light transmission layer 17) to thereby attract the punched piece CH thereto. The ultrasonic generator 38 generates ultrasonic waves under the control of the control section 10 to vibrate the ultrasonic horn 37, thereby applying ultrasonic vibration to the disk-shaped substrate D1 via the ultrasonic horn 37. In this case, the ultrasonic generator 38 has a vibration frequency of approximately 28 kHz, by way of example, and generates longitudinal vibration (simple harmonic motion) the direction of which is the same as the urging direction of the ultrasonic horn 37 on the disk-shaped substrate D1, indicated by an arrow A1, thereby causing ultrasonic vibration of the ultrasonic horn 37. The vertical movement mechanism 39 corresponds to a moving mechanism in the present invention, and under the control of the control section 10, vertically moves the ultrasonic generator 38 and the ultrasonic horn 37 in the directions (toward and away directions in the present invention) indicated by the arrows A1 and A2.

Figure 7:
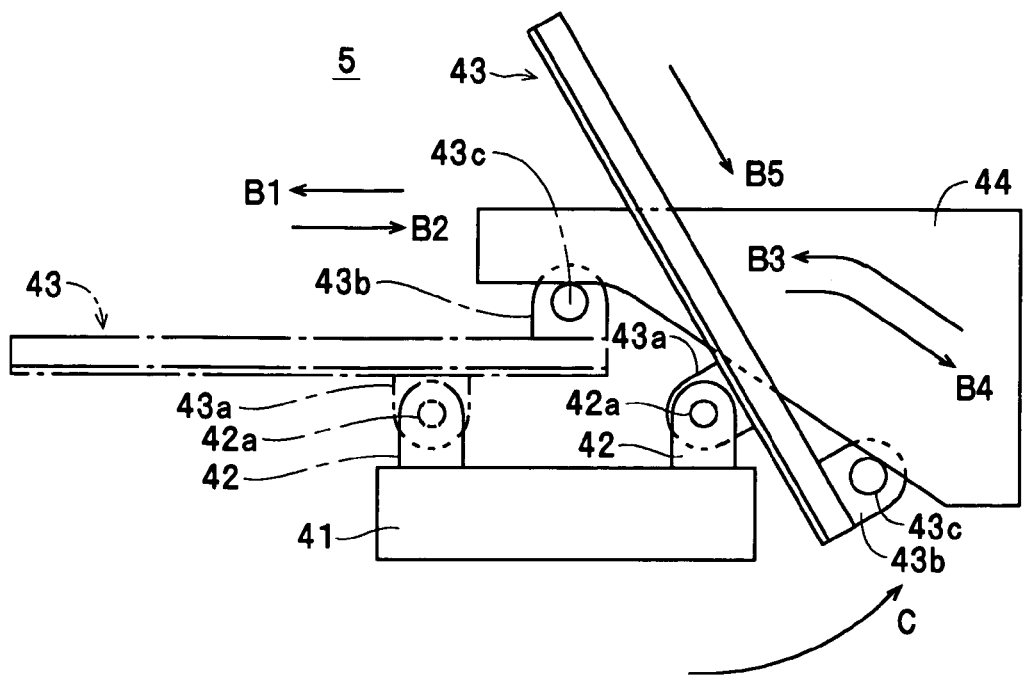
FIG. 7 is a side view showing the arrangement of a collector of the manufacturing apparatus.

Referring to FIG. 7, the collector 5 is comprised of a moving mechanism 41, a collecting arm 43, and a slider 44, and disposed at a location on a side of the central hole-forming location P3 in which the punching machine 4 is mounted, as shown in FIG. 4. As shown in FIG. 7, the moving mechanism 41 causes the stay 42 to slide in directions indicated by arrows B1 and B2 in FIG. 7 (in the directions of moving toward and away from the punching machine 4), under the control of the control section 10. The collecting arm 43 is made by forming e.g. a metal plate which is surface-treated for reducing sliding resistance, such that it has a generally U-shaped cross section opening upward, and pivotally mounted on a pivot 42a of the stay 42 of the moving mechanism 41 via a stay 43a. Further, the collecting arm 43 includes a stay 43b rigidly fixed to a rear end thereof and a slide pin 43c attached to the stay 43b, and is urged e.g. by a helical spring, not shown, mounted around the pivot 42a in a direction indicated by an arrow C.

When the stay 42 is caused to slide by the moving mechanism 41 in the direction indicated by the arrow B1, the slide pin 43c is caused to slide along the underside surface of the slider 44 in a direction indicated by an arrow B3. At this time, while being changed from an inclined position indicated by solid lines to a horizontal position indicated by one-dot chain lines, the collecting arm 43 has its free end advanced into between the punched piece CH attracted by the ultrasonic horn 37 of the punching machine 4 and the optical recording medium D2 (disk-shaped substrate D1 having the central hole 18 formed by punching). In this state, when the sucking or attraction of the punched piece CH by the ultrasonic horn 37 is stopped, the punched piece CH falls onto the free end of the collecting arm 43. Further, when the stay 42 is caused to slide by the moving mechanism 41 in the direction indicated by the arrow B2, the slide pin 43c is caused to slide along the underside surface of the slider 44 in a direction indicated by an arrow B4. In this case, while being changed from the horizontal position indicated by the one-dot chain lines to the inclined position indicated by the solid lines, the collecting arm 43 has its free end retracted from the upper surface of the optical recording medium D2. In this case, the punched piece CH having fallen onto the free end of the collecting arm 43 slides downward along the collecting arm 43 in a direction indicated by an arrow B5 to fall onto a predetermined collecting area.

Figure 8:
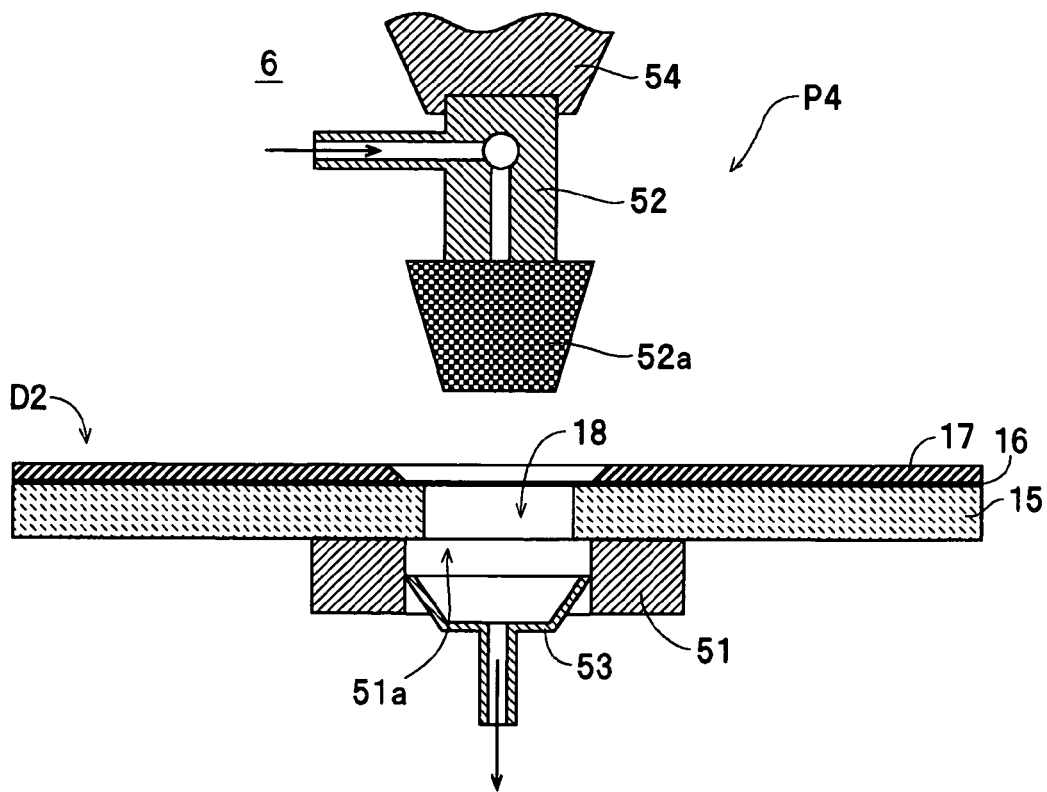
FIG. 8 is a cross-sectional view showing the arrangement of a cleaner of the manufacturing apparatus.

Referring to FIG. 8, the cleaner 6 is comprised of a table 51, a blowing section 52, a sucking section 53, and a vertical movement mechanism 54, and disposed at a cleaning location P4, as shown in FIG. 4. As shown in FIG. 8, the table 51 is configured to be capable of supporting the optical recording medium D2 placed thereon, and formed with a central hole 51a having a diameter larger than that of the central hole 18 and extending through a central portion thereof. The blowing section 52 has a nozzle 52a mounted on an end thereof, which is made of a porous material and has a truncated conical shape. The blowing section 52 is moved downward toward the optical recording medium D2 on the table 51 by the vertical movement mechanism 54. Further, the blowing section blows compressed air supplied under pressure from a pressure pump (compressor), not shown, toward the optical recording medium D2 from the nozzle 52a. In the present embodiment, the nozzle 52a is formed such that the diameter of a distal end (lower end) thereof is smaller than that of the central hole 18, and the diameter of a root end (upper end) thereof is larger than that of the central hole 18. The sucking section 53 is disposed in the central hole 51a of the table 51, and connected to a suction pump, not shown, to thereby suck air from the vicinity of or through the central hole 18 of the optical recording medium D2 on the table 51. The cleaner 6 may also be configured such that only one of the blowing section 52 and the sucking section 53 is provided. Further, it is possible to blow gas, such as nitrogen gas, toward the optical recording medium D2 in place of the compressed air.

The delivery mechanism 7 includes a sucking section 7a mounted on a distal end thereof, for sucking the optical recording medium D2 thereto, and a pivot arm 7b constructed in a vertically movable fashion, as shown in FIG. 4. The delivery mechanism 7 transfers the optical recording medium D2 from a delivery location P5 to a stack location PE under the control of the control section 10. At the stack location PE, a plurality of optical recording media D2, D2 . . . , each having the central hole 18 formed therein (completed), are stacked. The disk-detecting section 8 is comprised of a light-emitting element and a light-receiving element, by way of example, and installed at a detecting location P6. When the optical recording medium D2 is transferred to the detecting location P6 by the transfer mechanism 9, the disk-detecting section 8 detects the optical recording medium D2 moving (passing) over the detecting location P6 from the delivery location P5 to the feed location P1, and delivers a signal indicative of the detection to the control section 10.

Figure 9:
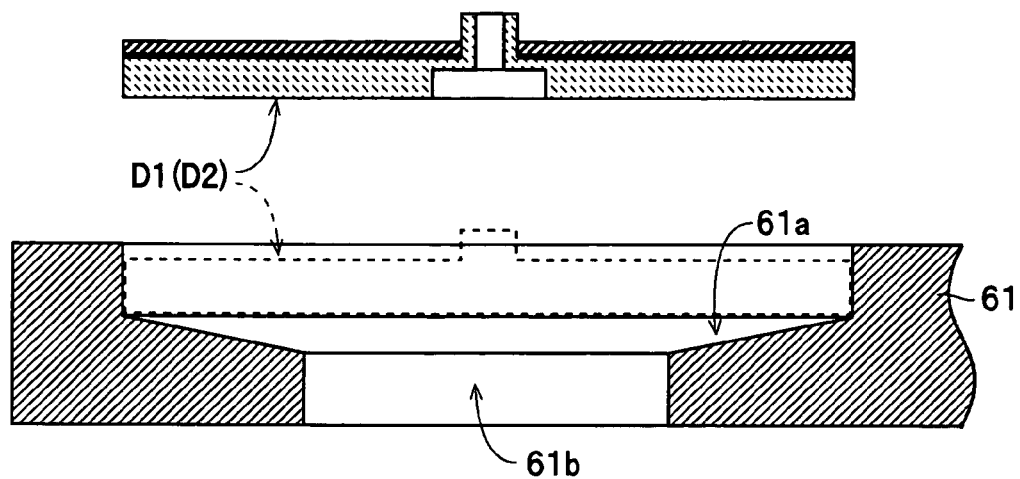
FIG. 9 is a fragmentary cross-sectional view of a transfer mechanism (transfer stage) of the manufacturing apparatus.

Referring to FIG. 1, the transfer mechanism 9 is comprised of a transfer stage 61, an indexing mechanism 62, and a vertical movement mechanism 63. As shown in FIG. 4, the transfer stage 61 is generally disk-shaped, and mounted on the indexing mechanism 62 via a rotational shaft 62a. Further, the transfer stage 61 is formed with six disk-placing recesses 61a, 61a, . . . each capable of having disk-shaped substrates D1 (optical recording media D2) placed therein. The disk-placing recesses 61a, 61a, . . . are formed at respective locations at the same distance from the center of the transfer stage 61, and at the same time at circumferentially equal intervals. Further, as shown in FIG. 9, each disk-placing recess 61a has a bottom thereof formed with a working hole 61b for enabling the cut-forming machine 3, and the punching machine 4, or the like to be brought into abutment with the lower surface of the disk-shaped substrate D1 (optical recording medium D2) placed in the disk-placing recess 61a. The indexing mechanism 62 intermittently rotates i.e. indexes the transfer stage 61 under the control of the control section 10 each time through 60 degrees in a direction indicated by an arrow E in FIG. 4, to thereby transfer the disk-shaped substrate D1 (optical recording medium D2) placed in the disk-placing recess 61a of the transfer stage 61 sequentially to the feed location P1, the cut-forming location P2, the central hole-forming location P3, the cleaning location P4, and the delivery location P5. The vertical movement mechanism 63 moves the transfer stage 61 upward and downward under the control of the control section 10, to thereby move the disk-shaped substrates D1 (optical recording media D2) placed on the transfer stage 61 upward and downward with respect to the cut-forming machine 3, the punching machine 4, and so forth.

The control section 10 controls the operations of the feed mechanism 2, the cut-forming machine 3, the punching machine 4, the collector 5, the cleaner 6, the delivery mechanism 7, and the transfer mechanism 9. Further, when a predetermined signal is output by the disk-detecting section 8, the control section 10 carries out a stop process for stopping the operation of the manufacturing apparatus 1. The operating section 11 includes a start button for starting manufacturing of optical recording media D2 by the manufacturing apparatus 1, a stop button for stopping the operation of the manufacturing apparatus 1, and so forth, neither of which is shown. The display 12 displays various kinds of information e.g. concerning operating states of the manufacturing apparatus 1 under the control of the control section 10.

Next, a method of manufacturing the optical recording media D2 by the manufacturing apparatus 1 will be described with reference to drawings. It is assumed here that the manufacturing of the disk-shaped substrate D1 (injection molding of the substrate 15, and formation of the thin films 16 and the light transmission layer 17 on the upper surface of the substrate 15) has already been completed, and a plurality of the disk-shaped substrates D1, D1 . . . are stacked at the stack location PS.

Figure 10:
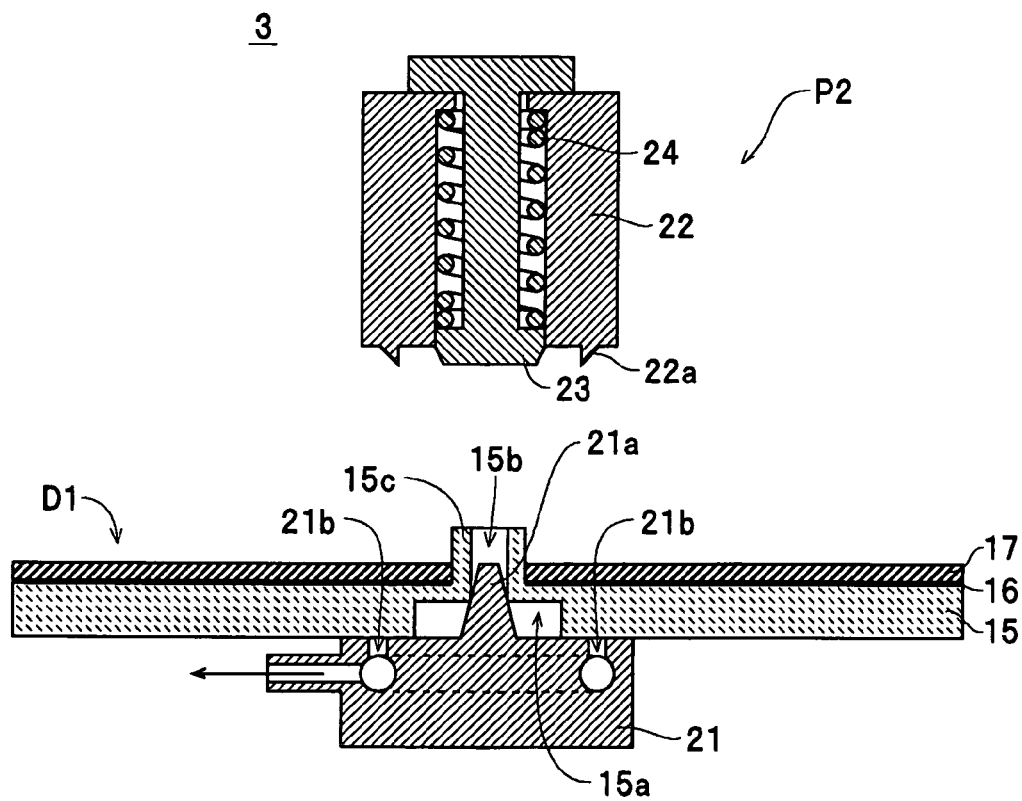
FIG. 10 is a cross-sectional view of the cut-forming machine in a state in which a disk-shaped substrate is sucked to a table of the cut-forming machine.

When the start button of the operating section 11 is operated by an operator, first, the control section 10 causes the feed mechanism 2 to feed one of the disk-shaped substrates D1 from the stack location PS to the feed location P1. In doing this, first, the feed mechanism 2, after pivoting the pivot arm 2b to the stack location PS and then moving the same downward, sucks a central portion (around the protrusion 15c) of the front surface of the disk-shaped substrate D1 thereto by the sucking portion 2a. Then, after moving the pivot arm 2b upward, pivoting the same to the feed location P1, and then moving the same downward, the feed mechanism 2 stops the sucking of the disk-shaped substrate D1 by the sucking portion 2a, at a location upward of the disk-placing recess 61a of the transfer stage 61. Thus, as indicated by broken lines in FIG. 9, the feed of the disk-shaped substrate D1 onto the transfer stage 61 (feed of the disk-shaped substrate D1 onto the feed location P1) is completed. Then, the control section 10 causes the transfer mechanism 9 to transfer the disk-shaped substrate D1 placed on the transfer stage 61 from the feed location P1 to the cut-forming location P2. In doing this, in the transfer mechanism 9, first, the vertical movement mechanism 63 lifts the transfer stage 61, then the indexing mechanism 62 rotates the transfer stage 61 through 60 degrees in the direction indicated by the arrow E shown in FIG. 4, and thereafter the vertical movement mechanism 63 lowers the transfer stage 61. Thus, the transfer of the disk-shaped substrate D1 from the feed location P1 to the cut-forming location P2 is completed. In this case, as shown in FIG. 10, when the disk-shaped substrate D1 transferred to the cut-forming location P2 by the transfer mechanism 9 is lowered by the vertical movement mechanism 63, the positioning protrusion 21a of the table 21 is fitted into the positioning hole 15b of the disk-shaped substrate D1 from the lower surface side thereof, whereby the central portion of the disk-shaped substrate D1 is aligned with (positioned with respect to) the central portion of the table 21. It should be noted that for ease of understanding of the present invention, the illustration of the transfer stage 61 etc. is omitted in FIGS. 10 to 18 with reference to which the present embodiment is described.

Figure 11:
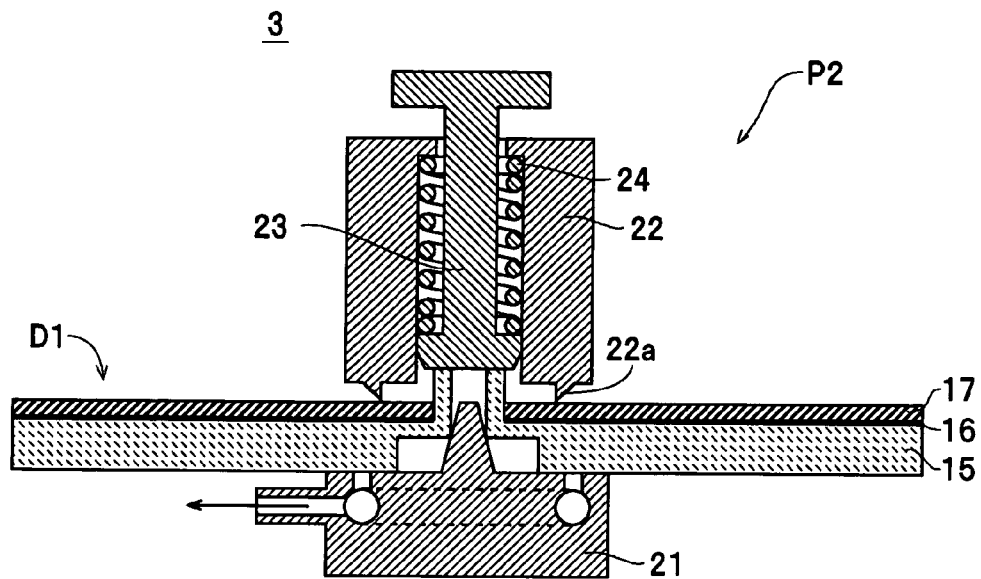
FIG. 11 is a cross-sectional view of the cut-forming machine in a state in which the blade of the cut-forming blade section is brought into abutment with the disk-shaped substrate in the state shown in FIG. 10.
Figure 12:
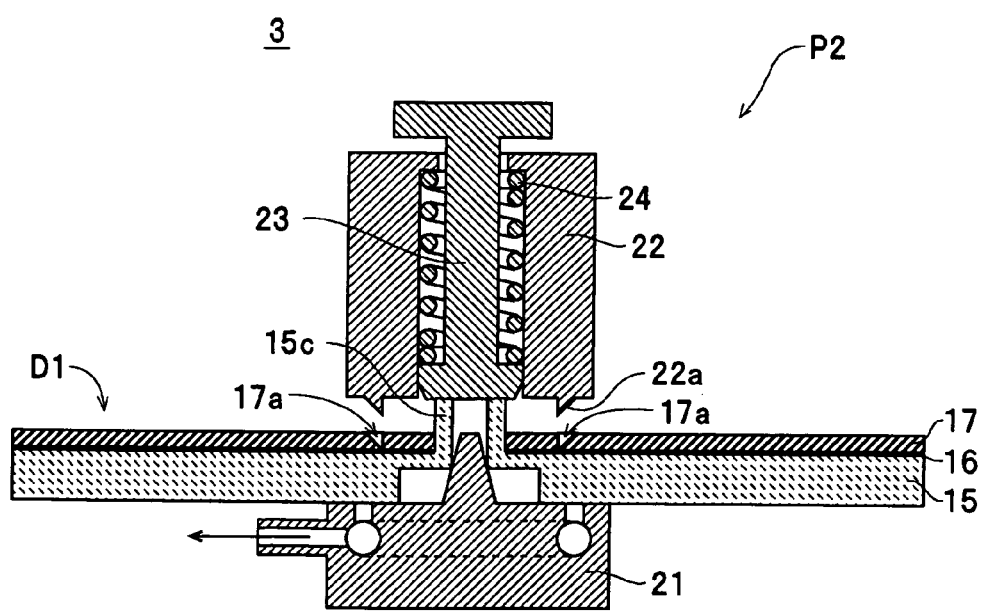
FIG. 12 is a cross-sectional view of the cut-forming machine in a state in which the cut-forming blade section is moved upward after completion of forming a cut in the disk-shaped substrate.

Next, the control section 10 causes the cut-forming machine 3 to form a cut 17a in the light transmission layer 17 of the disk-shaped substrate D1. More specifically, first, the control section 10 causes a suction pump, not shown, to operate for sucking air between the lower surface of the disk-shaped substrate D1 and the upper surface of the table 21 through the suction holes 21b, 21b, . . . Thus, the lower surface of the disk-shaped substrate D1 (around the recess 15a) is brought into intimate contact with the upper surface of the table 21 whereby the disk-shaped substrate D1 is held. Next, the control section 10 causes the vertical movement mechanism 25 to move the cut-forming blade section 22 downward toward the disk-shaped substrate D1. In doing this, as the cut-forming blade section 22 is moved downward, first, the lower end face of the urging portion 23 is brought into abutment with the upper end of the protrusion 15c, and in this state, the cut-forming blade section 22 is moved further downward, whereby, as shown in FIG. 11, the cutting edge of the blade 22a is brought into abutment with the upper surface of the light transmission layer 17 of the disk-shaped substrate D1. Then, when the cut-forming blade section 22 is moved further downward by the vertical movement mechanism 25, the blade 22a is pushed into the light transmission layer 17. Since the height of the blade 22a is defined such that it is slightly larger than the thickness of the light transmission layer 17, if the cut-forming blade section 22 is moved downward until the bottom end face of the cut-forming blade section 22 is brought into abutment with the upper surface of the light transmission layer 17, the cutting edge of the blade 22a reaches the upper surface of the substrate 15. Thus, in the light transmission layer 17, there is formed a circular cut 17a (see FIG. 12) which has a diameter approximately equal to the diameter (16 mm, in the illustrated example) of the blade 22a. Then, as shown in FIG. 12, the control section 10 causes the vertical movement mechanism 25 to move the cut-forming blade section 22 upward. In doing this, since the disk-shaped substrate D1 is being urged on the table 21 by the urging portion 23 and attracted to the table 21, it is possible to positively avoid the inconvenience that the disk-shaped substrate D1 is moved upward together with the cut-forming blade section 22 whose blade 22a remains stuck therein. Thus, formation of the cut 17a in the disk-shaped substrate D1 is completed. Further, the control section 10 causes the feed mechanism 2 to feed a new disk-shaped substrate D1 from the stack location PS to the feed location P1 in parallel with the operation of forming the cut 17a by the cut-forming machine 3 at the cut-forming location P2.

Figure 13:
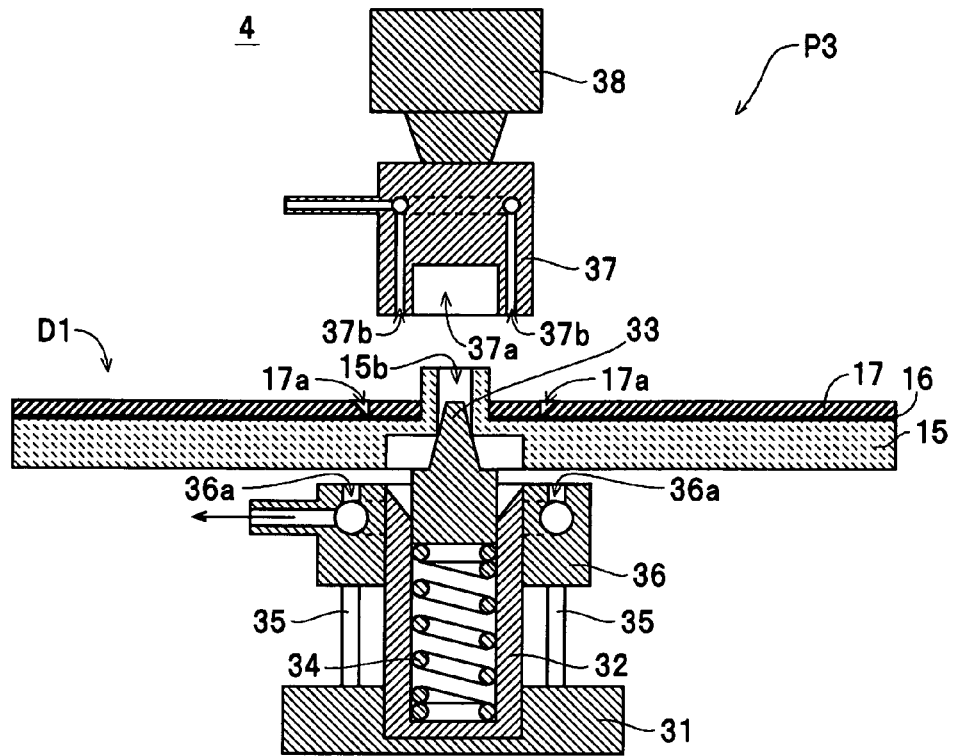
FIG. 13 is a cross-sectional view of the punching machine in a state in which a positioning protrusion of the punching machine is fitted in a positioning hole of the disk-shaped substrate.

Then, the control section 10 stops the suction pump, thereby stopping the sucking of the disk-shaped substrates D1 to the table 21, and then causes the transfer mechanism 9 to transfer the disk-shaped substrate D1 having the cut 17a formed therein, from the cut-forming location P2 to the central hole-forming location P3. While the disk-shaped substrate D1 formed with the cut 17a is transferred, the new disk-shaped substrate D1 fed to the feed location P1 is transferred from the feed location P1 to the cut-forming location P2 in accordance with rotation of the transfer stage 61. On the other hand, as shown in FIG. 13, the disk-shaped substrate D1 formed with the cut 17a transferred to the central hole-forming location P3 has the positioning protrusion 33 fitted into the positioning hole 15b thereof from the lower surface side of the disk D1 along with the downward movement of the transfer stage 61, whereby the center of the disk-shaped substrate D1 is substantially aligned with the center of the punching blade section 32. Subsequently, the control section 10 causes the punching machine 4 to form a central hole 18 in the central portion of the disk-shaped substrate D1. More specifically, first, the control section 10 causes the vertical movement mechanism 39 to move the ultrasonic generator 38 and the ultrasonic horn 37 downward toward the disk-shaped substrate D1. In doing this, first, the bottom surface of the ultrasonic horn 37 is brought into abutment with the front surface of the disk-shaped substrate D1, and in this state, when the ultrasonic horn 37 is moved further downward, the disk-shaped substrate D1 is moved downward while the spring 34 is compressed. Further, the control section 10 causes the suction pump, not shown, to operate for sucking air between the lower surface of the disk-shaped substrate D1 and the upper surface of the substrate-receiving table 36 through the suction holes 36a, 36a . . .

Figure 14:
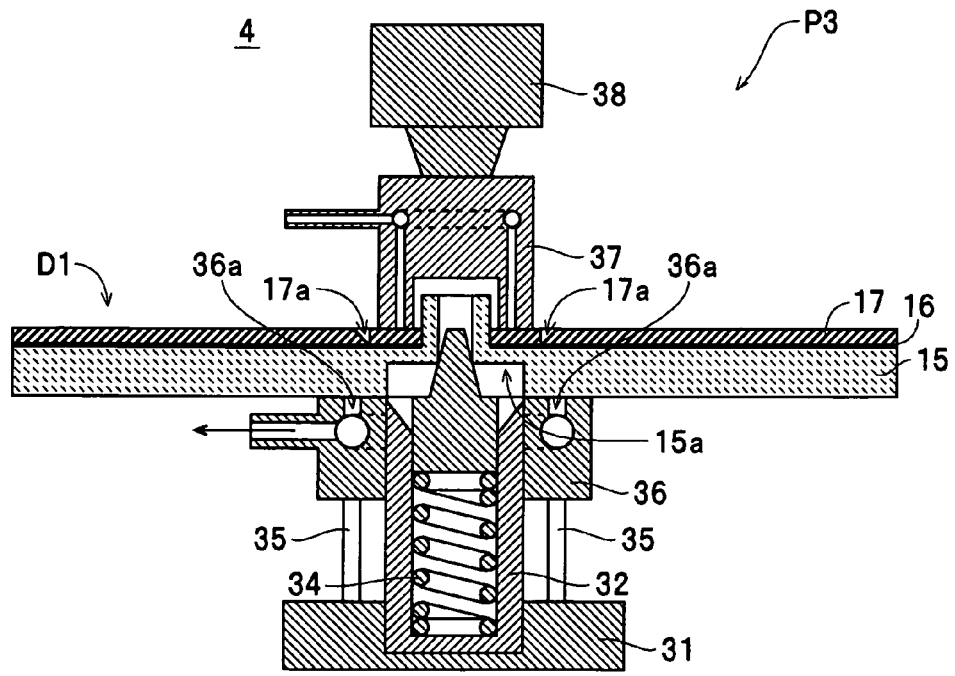
FIG. 14 is a cross-sectional view of the punching machine in a state in which the disk-shaped substrate is brought into abutment with a substrate-receiving table, after having been moved downward by an ultrasonic horn.

Next, when the disk-shaped substrate D1 is moved further downward by the vertical movement mechanism 39, the spring 34 is further compressed and the positioning protrusion 33 causes the center of the disk-shaped substrate D1 to be aligned with (positioned with respect to) the center of the punching blade section 32. In this state, as shown in FIG. 14, the lower surface (around the recess 15a) of the disk-shaped substrate D1 is brought into intimate surface contact with the upper surface of the substrate-receiving table 36 by the attractive force of vacuum or reduced pressure created by sucking air from the suction holes 36a, 36a, . . . , whereby the disk-shaped substrate D1 is held at the substrate-receiving table 36. Then, the control section 10 causes the ultrasonic generator 38 to generate ultrasonic waves, while causing the vertical movement mechanism 39 to continue to move the disk-shaped substrate D1 downward. In this case, the ultrasonic horn 37 is caused to perform longitudinal vibration by the ultrasonic waves generated by the ultrasonic generator 38, and the vibration is transmitted to the disk-shaped substrate D1. Subsequently, when the disk-shaped substrate D1 is moved further downward by the vertical movement mechanism 39, the substrate-receiving table 36 is moved downward together with the disk-shaped substrate D1 such that the air cylinders 35, 35, . . . are compressed, whereby the cutting edge of the punching blade section 32 enters the recess 15a of the disk-shaped substrate D1. At this time, since the outer diameter (e.g. 15.04 mm) of the punching blade section 32 is slightly smaller than the inner diameter (e.g. 15.06 mm) of the recess 15a, the punching blade section 32 is moved upward relative to the disk-shaped substrate D1 without rubbing the outer peripheral surface thereof against the inner wall surface of the recess 15a.

Figure 15:
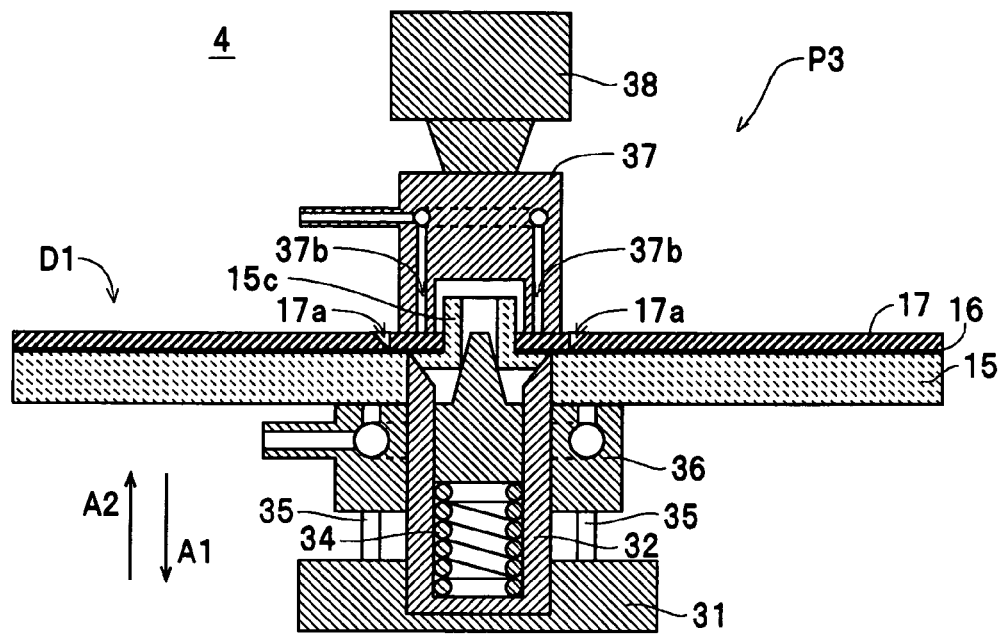
FIG. 15 is a cross-sectional view of the punching machine in a state in which a cutting edge of a punching blade section is pushed into the disk-shaped substrate by moving the disk-shaped substrate in the state shown in FIG. 14 further downward.

Then, after the disk-shaped substrate D1 is moved further downward by the vertical movement mechanism 39, thereby causing the cutting edge of the punching blade section 32 to be brought into abutment with the bottom surface of the recess 15a, as shown in FIG. 15, the disk-shaped substrate D1 is moved further downward, whereby the cutting edge of the punching blade section 32 is pushed into the substrate 15. At this time, the downward motion of the ultrasonic horn 37 causes the translating motion of the substrate-receiving table 36 along the side of the punching blade section 32, which causes the translating motion of the disk-shaped substrate D1 in a state brought into surface contact with the upper surface of the substrate-receiving table 36, in the direction of thickness of the substrate D1. Further, since the disk-shaped substrate D1 is caused to perform longitudinal vibration in the direction of being urged by the ultrasonic horn 37 (i.e. in the direction of the punching blade section 32 being pushed into the disk-shaped substrate D1) by the ultrasonic waves transmitted via the ultrasonic horn 37, the cutting edge of the punching blade section 32 is smoothly pushed into the substrate 15. Therefore, differently from the punching method in which the disk-shaped substrate D1 is not vibrated, even with a small relative force applied to the disk-shaped substrate D1 in the direction indicated by the arrow A2, the punching blade section 32 can be pushed into the substrate 15 to form the central hole 18. Further, since the substrate 15 has the recess 15a formed therein in advance during preparation thereof, it is possible to form the central hole 18 by punching a portion having a far smaller thickness compared with the case of punching a substrate without the recess 15a.

Figure 16:
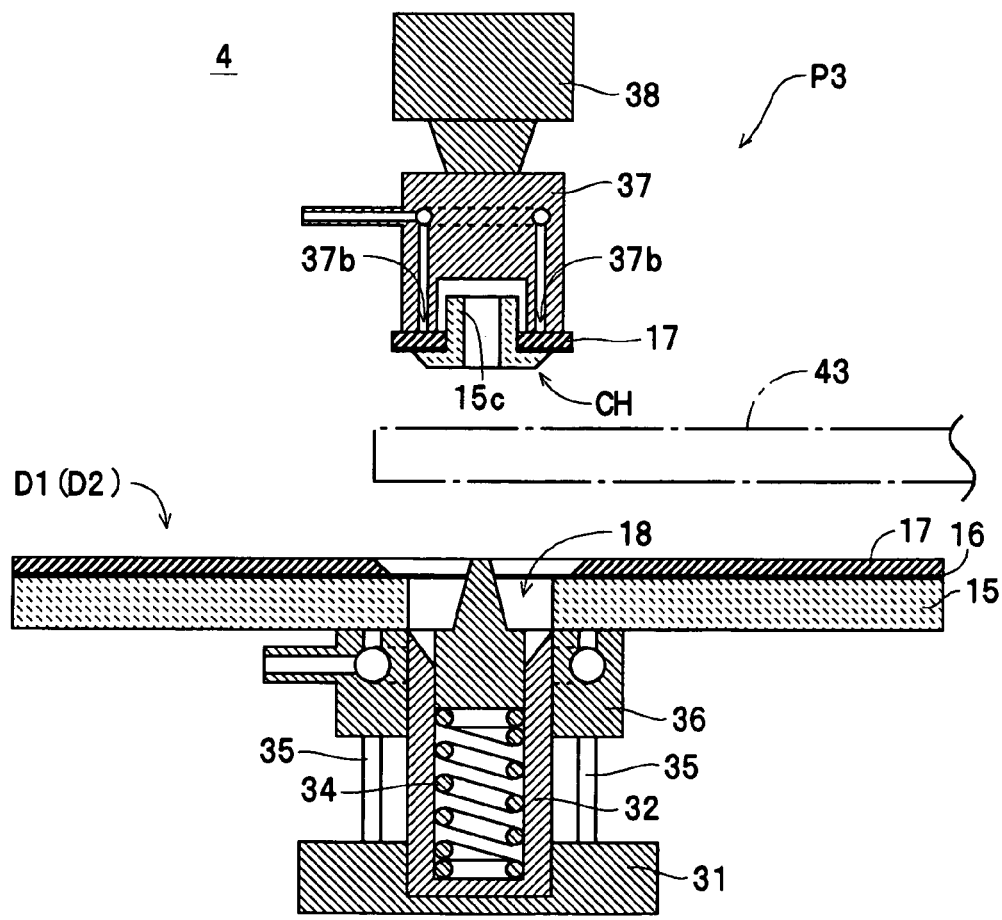
FIG. 16 is a cross-sectional view of the punching machine in a state in which the ultrasonic horn is moved upward after the central hole is formed by punching.

Next, the control section 10 causes the suction pump, not shown, to operate for sucking air between the front surface (around the protrusion 15c) of the disk-shaped substrate D1 and the underside surface of the ultrasonic horn 37 through the suction holes 37b, 37b . . . As a result, the punched piece CH (see FIG. 16) punched off by the punching blade section 32 is sucked (held) by the ultrasonic horn 37. Then, the control section 10 causes the vertical movement mechanism 39 to move the ultrasonic generator 38 and the ultrasonic horn 37 upward. At this time, the disk-shaped substrate D1 is moved upward along with the upward movement of the ultrasonic horn 37, whereby the air cylinders 35, 35, . . . are extended to move the substrate-receiving table 36 upward for translating motion. Further, when the ultrasonic horn 37 is moved further upward to fully extend the air cylinders 35, 35, . . . , as shown in FIG. 16, the punched piece CH sucked to the ultrasonic horn 37 is separated from the disk-shaped substrate D1 (substrate 15) and moved upward together with the ultrasonic horn 37. At this time, sine the disk-shaped substrate D1 is sucked and held at the substrate-receiving table 36, it is possible to avoid the inconvenience that the disk-shaped substrate D1 is moved upward together with the punched piece CH and the ultrasonic horn 37. Thus, formation of the central hole 18 through the disk-shaped substrate D1 is completed (in the following description, the disk-shaped substrate D1 having the central hole 18 formed therethrough is also referred to as the "optical recording medium D2"). It should be noted that the control section 10 causes the cut-forming machine 3 to form the cut 17a at the cut-forming location P2 in parallel with the operation of forming the central hole 18 by the punching machine 4 at the central hole-forming location P3, and at the same time causes the feed mechanism 2 to feed a new disk-shaped substrate D1 from the stack location PS to the feed location P1.

Then, the control section 10 causes the collector 5 to collect the punched piece CH. More specifically, the control section 10 causes the moving mechanism 41 of the collector to slide the stay 42 in the direction indicated by the arrow B1 in FIG. 7, thereby causing the free end of the collecting arm 43 to advance between the optical recording medium D2 on the substrate-receiving table 36 and the punched piece CH sucked to the ultrasonic horn 37, as indicated by one-dot chain lines in FIG. 16. Then, the control section 10 stops the operation of the suction pump, thereby stopping the sucking of the punched piece CH by the ultrasonic horn 37, whereupon the punched piece CH sucked by the ultrasonic horn 37 is dropped off onto the collecting arm 43. Subsequently, the control section 10 causes the moving mechanism 41 of the collector 5 to slide the stay 42 in the direction indicated by the arrow B2 in FIG. 7, thereby retracting the collecting arm 43. This causes the collecting arm 43 to be inclined, whereby the punched piece CH is slid downward from the free end of the collecting arm 43 in the direction of the root end thereof to be dropped to a predetermined collecting location. Thus, the collection of the punched piece CH is completed.

Figure 17:
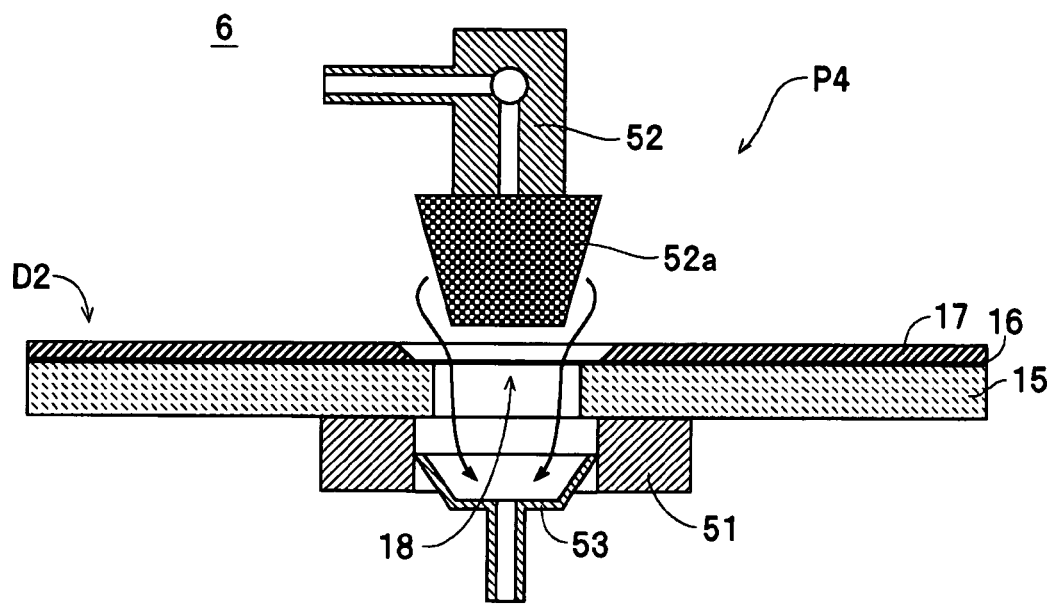
FIG. 17 is a cross-sectional view of the cleaner in a state in which a blowing section of the cleaner is moved to a position over the central hole of the disk-shaped substrate, for cleaning.
Figure 18:
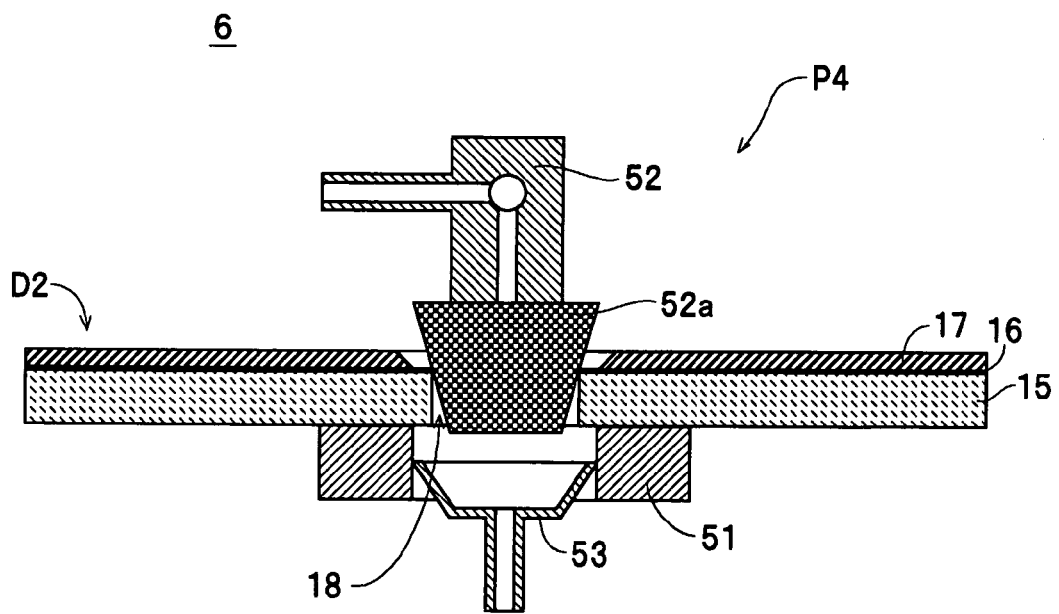
FIG. 18 is a cross-sectional view of the cleaner in a state in which a peripheral surface of a nozzle of the blowing section is brought into abutment with a rim of the central hole by moving the blowing section in the state shown in FIG. 17 further downward.

Next, the control section 10 causes the transfer mechanism 9 to transfer the optical recording medium D2 having the central hole 18 formed therethrough, from the central hole-forming location P3 to the cleaning location P4. At this time, the disk-shaped substrate D1 fed to the feed location P1 by the feed mechanism 2 is transferred from the feed location P1 to the cut-forming location P2 in accordance with rotation of the transfer stage 61, while the disk-shaped substrate D1 having the cut 17a formed by the cut-forming machine 3 is transferred from the cut-forming location P2 to the central hole-forming location P3. In this case, as shown in FIG. 17, the optical recording medium D2 transferred to the cleaning location P4 is placed on the table 51 of the cleaner 6 along with the downward movement of the transfer stage 61. Then, the control section 10 causes the cleaner 6 to clean a portion of the optical recording medium D2 in the vicinity of the central hole 18. More specifically, first, the control section 10 causes the pressure pump to operate to deliver compressed air from the nozzle 52a of the blowing section 52 for blowing, and at the same time causes the suction pump to operate to draw air from the vicinity of the central hole 18 of the optical recording medium D2 via the sucking section 53. Next, the control section 10 causes the vertical movement mechanism 54 to move the blowing section 52 downward. This causes the blowing section 52 to come closer to the optical recording medium D2, so that cuttings generated by punching and adhering to the periphery of the central hole 18 are blown away by the compressed air delivered from the nozzle 52a, and at the same time the cuttings are sucked into the sucking section 53 together with the air drawn from the vicinity of the central hole 18. Further, as shown in FIG. 18, when the blowing section 52 is moved further downward to bring the outer periphery of the nozzle 52a into abutment with the rim of the central hole 18, the control section 10 stops the pressure pump for a predetermined time period. Then, after the lapse of the predetermined time period, the control section 10 causes the pressure pump to operate again, and at the same time causes the vertical movement mechanism 54 to move the blowing section 52 upward. Thus, cleaning of the portion of the optical recording medium D2 in the vicinity of the central hole 18 is completed.

Next, the control section 10 causes the transfer mechanism 9 to transfer the optical recording medium D2 having the central hole 18 cleaned, from the cleaning location P4 to the delivery location P5. At this time, the disk-shaped substrate D1 fed to the feed location P1 by the feed mechanism 2 is transferred from the feed location P1 to the cut-forming location P2 in accordance with rotation of the transfer stage 61, and the disk-shaped substrate D1 having the cut 17a formed by the cut-forming machine 3 is transferred from the cut-forming location P2 to the central hole-forming location P3. Further, the optical recording medium D2 having the central hole 18 formed by the punching machine 4 is transferred from the central hole-forming location P3 to the cleaning location P4 at the same time. Then, the control section 10 causes the delivery mechanism 7 to deliver the optical recording medium D2 transferred to the delivery location P5, to the stack location PE. In doing this, first, the delivery mechanism 7 causes the pivot arm 7b to pivot to the delivery location P5, and move downward, thereafter causing the sucking section 7a to suck the central portion (around the central hole 18) of the front surface of the optical recording medium D2 thereto. Then, the delivery mechanism 7 causes the pivot arm 7b to move upward, pivot to the stack location PE, and move downward, thereafter stopping the sucking section 7a from sucking the optical recording medium D2. Thus, delivery of the optical recording medium D2 is completed.

Thereafter, the control section 10 alternately and repeatedly carries out the operations of feed of a disk-shaped substrate D1 by the feed mechanism 2, formation of a cut 17a by the cut-forming machine 3, formation of a central hole 18 by the punching machine 4, cleaning of an optical recording medium D2 by the cleaner 6, and delivery of the optical recording medium D2 by the delivery mechanism 7, and the operation of transfer (rotation of the transfer stage 61) of disk-shaped substrates D1, D1 . . . , and optical recording media D2, D2 . . . , by the transfer mechanism 9. Further, for example, when there is an optical recording medium D2 transferred to the detecting location P6 by the rotation of the transfer stage 61 without being delivered from the transfer stage 61 owing to insufficient suction or attraction of the optical recording medium D2 by the sucking section 7a, the disk-detecting section 8 delivers the predetermined signal to the control section 10. In this case, the control section 10 executes the stop process for stopping the operations of the feed mechanism 2, the cut-forming machine 3, the punching machine 4, the collector 5, the cleaner 6, the delivery mechanism 7, and the transfer mechanism 9, while causing the display 12 to display an error message to the effect that the optical recording medium D2 has not been delivered, and at the same time causing a loudspeaker, not shown, to produce an alarm sound. This causes the operator to recognize that the optical recording medium D2 has not been delivered, so that the operator removes the optical recording medium D2 from the transfer stage 61 (the detecting location P6). This makes it possible to avoid the inconvenience that a new disk-shaped substrate D1 is fed onto the optical recording medium D2 left undelivered from the transfer stage 61. Further, after the optical recording medium D2 is removed from the transfer stage 61, the operator operates the start button of the operating section 11. In response to this, the control section 10 causes the manufacturing apparatus 1 to resume the process for manufacturing optical recording media D2.

As described hereinabove, according to the manufacturing apparatus 1, the control section 10 causes the vertical movement mechanism 39 to move the ultrasonic horn 37 in the direction approaching the cutting edge of the punching blade section 32 (in the direction indicated by the arrow A1 in FIG. 6) to thereby press the disk-shaped substrate D1, and causes the ultrasonic generator 38 to continuously perform ultrasonic vibration from a time point at which the disk-shaped substrate D1 is brought into contact with the cutting edge of punching blade section 32 to a time point at which punching of the central hole 18 is completed. This causes the disk-shaped substrate D1 to perform ultrasonic vibration by the ultrasonic waves transmitted by the ultrasonic horn when the central hole 18 is punched through the disk-shaped substrate D1, so that the cutting edge of the punching blade section 32 can be smoothly pushed into the disk-shaped substrate D1. Therefore, even with a small relative force applied to the disk-shaped substrate D1 in the direction approaching the cutting edge of the punching blade section 32 (direction indicated by the arrow A2 in FIG. 6), the punching blade section 32 can be pushed into the substrate 15. This prevents the substrate 15 from being partially broken before the cutting edge of the punching blade section 32 reaches the reverse side of the substrate 15 (before the central hole 18 is punched out). Further, differently from the configuration in which the central hole 18 is punched while causing ultrasonic vibration of the punching blade section 32, since the disk-shaped substrate 32 can be brought into abutment with the punching blade section 32 at rest, it is possible to prevent the central hole 18 from being formed off-center with respect to the substrate D1.

Further, according to the manufacturing apparatus 1, the vertical movement mechanism 39 causes the ultrasonic horn 37 to move in the direction approaching the cutting edge of the punching blade section 32, thereby causing the punching blade section 32 to be pushed into the disk-shaped substrate D1 while causing the positioning protrusion 33 inserted into the positioning hole 15b of the disk-shaped substrate D1 to move in the approaching direction together with the disk-shaped substrate D1. This makes it possible to cause the disk-shaped substrate D1 to be brought into abutment with the punching blade section 32 with the center of the disk-shaped substrate D1 being aligned with the center of the punching blade section 32, and therefore, it is possible to positively prevent the central hole 18 being formed off-center with respect to the substrate D1.

Furthermore, according to the manufacturing apparatus 1, the vertical movement mechanism 39 causes the ultrasonic horn 37 to move in the direction approaching the cutting edge of the punching blade section 37, thereby causing the punching blade section 32 to be pushed into the disk-shaped substrate D1 while causing the substrate-receiving table 36 to move together with the disks-shaped substrate D1 such that the substrate-receiving table 36 causes the translating motion of the disk-shaped substrate D1 in the approaching direction. Therefore, in a normal or unmoved state, the cutting edge of the punching blade section 32 is inhibited from protruding from the contract surface of the table 36 on which the substrate D1 is placed, which makes it possible to prevent an operator from being injured by an accidental or careless touch of his hand on the cutting edge of the punching blade section 32, and prevent the punching blade section 32 from being broken owing to contact with other tools. Further, since the substrate-receiving table 36 causes the translating motion of the disk-shaped substrate D1, it is possible to prevent the substrate D1 from being inclined when the central hole 18 is punched. This makes it possible to form the central hole 18 which is perpendicular to the horizontal surface of the substrate D1.

Further, according to the manufacturing apparatus 1, the second urging device in the present invention is implemented by the air cylinders 35, 35, . . . . This makes it possible to prevent variation in the position of the substrate-receiving table 36 from being caused by permanent setting in fatigue of a spring, and hence accurately punch the central hole 18.

Furthermore, the manufacturing apparatus 1 includes the substrate-receiving table 36 formed with suction holes 36a, 36a, . . . , for holding the disk-shaped substrate D1 (optical recording medium D2) thereat by sucking the same thereto, and the ultrasonic horn 37 formed with suction holes 37b, 37b, . . . , for holding a punched piece CH punched off by the punching blade section 32 thereat by sucking the same thereto. This makes it possible to positively prevent the optical recording medium D2 from being moved upward (moved) by the upward motion of the ultrasonic horn 37, and it is no longer necessary for the operator to manually remove the punched piece CH from the disk-shaped substrate, which contributes to further enhanced manufacturing efficiency of the optical recording medium D2.

Furthermore, according to the manufacturing apparatus 1, since the ultrasonic generator 38 causes the longitudinal vibration of the ultrasonic horn 37, differently e.g. from the configuration in which the ultrasonic horn 37 is caused to perform simple harmonic motion along the horizontal surface of the disk-shaped substrate D1, the disk-shaped substrate D1 does not make shifts in position (vibration) in the horizontal direction, so that the central hole 18 can be punched in a state where the center of the disk-shaped substrate D1 and that of the punching blade section 32 are aligned with each other. This makes it possible to further positively prevent the central hole 18 from being formed off-center with respect to the substrate D1.

It should be noted that the present invention is by no means limited to the aforementioned embodiment. For example, although the embodiment of the present invention is described based on an example in which ultrasonic vibration of the disk-shaped substrate D1 is caused via the ultrasonic horn 37 from a time point immediately before the disk-shaped substrate D1 is brought into contact with the cutting edge of the punching blade section 32 to a time point at which the punching of the central hole 18 is completed, the present invention is by no means limited to this example, but the apparatus may be configured such that the ultrasonic vibration of the disk-shaped substrate D1 is caused via the ultrasonic horn 37 from a time point at which the disk-shaped substrate D1 is brought into contact with the cutting edge of the punching blade section 32 to a time point at which the punching of the central hole 18 is completed, or such that the ultrasonic generator 38 always causes the ultrasonic horn 37 to perform ultrasonic vibration. Further, although in the above-described embodiment, the ultrasonic generator 38 causes the longitudinal vibration of the ultrasonic horn 37, this is not limitative, but the ultrasonic horn 37 may be caused to perform e.g. torsional vibration such that the axis of vibration extends in the direction of the ultrasonic horn 37 urging the disk-shaped substrate D1 and coincides or substantially coincides with the center of the punching blade section 32 (i.e. center of the central hole 18 to be punched). Furthermore, although in the above-described embodiment, the punched piece CH is attracted to the ultrasonic horn 37 by sucking air around the protruding portion 15c via the suction holes 37b, 37b, . . . , but the construction of the punched piece-holding section in the present invention is not limited to the above-described construction, but the punched piece CH may be held by gripping the same.

Also, although in the present embodiment, there are employed air cylinders 35 configured such that they allow the substrate-receiving table 36 to perform downward translating motion through supply of the compressed air to the air chamber formed within the substrate-receiving table 36, and allow the substrate-receiving table 36 to perform upward translating motion through supply of the compressed air to the air chamber formed within the base 31, this is by no means limitative, but there may be employed another type of air cylinders configured such that they allow the substrate-receiving table 36 to perform downward translating motion through suction of air from the air chamber formed within the base 31 by a suction pump when the disk-shaped substrate D1 is caused to move downward, and allow the substrate-receiving table 36 to perform upward translating motion through suction of air from the air chamber formed within the substrate-receiving table 36 by a suction pump when the disk-shaped substrate D1 is caused to move upward. It is also possible to employ another type of air cylinders configured such that they cause the substrate-receiving table 36 to vertically move by supplying compressed to one of the air chamber in the base 31 and the air chamber in the substrate-receiving table 36 by a pressure pump and at the same time drawing air from the other of the air chambers by a suction pump. Further, it is also possible to employ another type of air cylinders configured such that the state of supply of compressed air to one of the two air chambers or the state of suction of air from one of the two air chambers is changed (i.e. the internal pressure in one of the air chambers is changed), to cause the substrate-receiving table 36 to move vertically.

What is claimed is:

1. An optical recording medium-manufacturing apparatus comprising:
    a punching blade section that is pushed into a disk-shaped substrate to thereby punch a central hole through the disk-shaped substrate, the punching blade section having a cutting edge;
    a pressing device that presses the disk-shaped substrate toward said punching blade section to thereby push said punching blade section into the disk-shaped substrate, said pressing device having an abutment portion that is brought into abutment with the disk-shaped substrate, a moving mechanism that moves said abutment portion in an approaching one of directions toward and away from said cutting edge of said punching blade section to thereby press the disk-shaped substrate, and an ultrasonic generator that causes ultrasonic vibration of said abutment portion; and
    a control section that controls operation of said pressing device by causing said moving mechanism to move said abutment portion in the approaching direction and causing said ultrasonic generator to perform ultrasonic vibration at least from a time point at which the disk-shaped substrate is brought into contact with said cutting edge of said punching blade section to a time point at which punching of the central hole is completed.

2. An optical recording medium-manufacturing apparatus as claimed in claim 1, further comprising a positioning protrusion disposed in a central portion of said punching blade section in a manner slidable in the toward and away directions, and a first urging device that urges the positioning protrusion toward said pressing device, and
    wherein said positioning protrusion is configured such that said positioning protrusion has a foremost end thereof protruded toward said pressing device with respect to said cutting edge of said punching blade section, and at the same time is capable of being inserted into a positioning hole formed in a central portion of the disk-shaped substrate, the positioning hole having a diameter smaller than a diameter of the central hole, and
    wherein said moving mechanism causes said abutment portion to move in the approaching direction to thereby cause said positioning protrusion inserted in the positioning hole to move in the approaching direction together with the disk-shaped substrate, to thereby cause said punching blade section to be pushed into the disk-shaped substrate.

3. An optical recording medium-manufacturing apparatus as claimed in claim 1, further comprising a substrate-receiving table formed with an insertion hole in a central portion thereof for allowing insertion of said punching blade section such that said substrate receiving table is slidable with respect to said punching blade section in the toward and away directions, and a second urging device that urges said substrate-receiving table toward said pressing device, said substrate-receiving table being normally positioned such that a surface of said substrate-receiving table which is brought into contact with the disk-shaped substrate is closer to said pressing device with respect to said cutting edge of said punching blade section, and
    wherein said moving mechanism causes said abutment portion to move in the approaching direction, to thereby cause said substrate-receiving table to move in the approaching direction together with the disk-shaped substrate to cause said punching blade section to be pushed into the disk-shaped substrate, and
    wherein said substrate-receiving table causes the disk-shaped substrate to move in the approaching direction when the disk-shaped substrate is pressed by said moving mechanism.

4. An optical recording medium-manufacturing apparatus as claimed in claim 3, wherein said second urging device is implemented by air cylinders.

5. An optical recording medium-manufacturing apparatus as claimed in claim 1, further comprising a substrate-holding section that sucks a portion of the disk-shaped substrate outward of an area where the central hole is formed, to thereby hold the disk-shaped substrate, and a punched piece-holding section that holds a punched piece which is punched off the disk-shaped substrate by said punching blade section.

6. An optical recording medium-manufacturing apparatus as claimed in claim 1, wherein said ultrasonic generator causes longitudinal vibration of said abutment portion.

* * * * *